Jan. 19, 1954     A. H. BRODBECK     2,666,837
FOOD CONDITIONER FOR COOKING RANGES
Filed Nov. 19, 1952     2 Sheets-Sheet 1
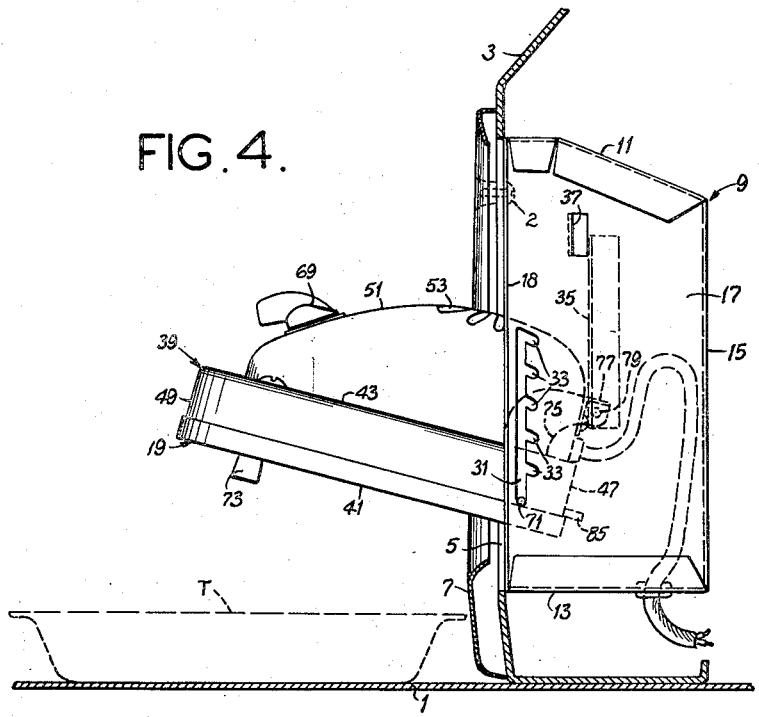
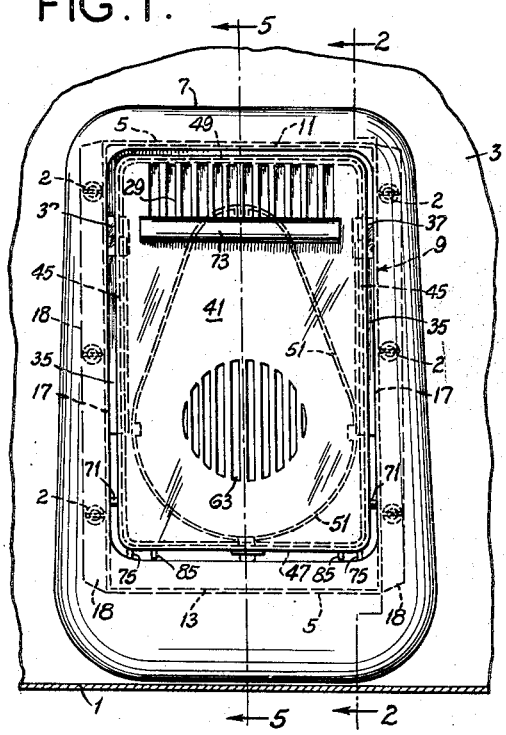
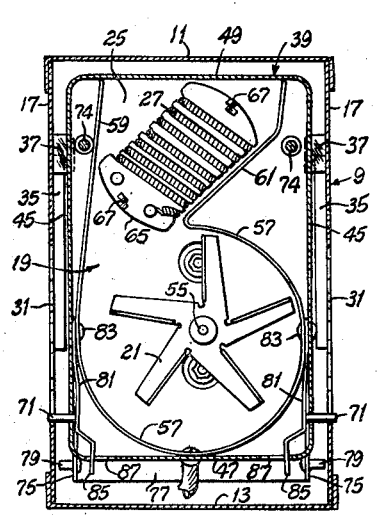

Jan. 19, 1954  A. H. BRODBECK  2,666,837
FOOD CONDITIONER FOR COOKING RANGES
Filed Nov. 19, 1952  2 Sheets-Sheet 2

Patented Jan. 19, 1954

2,666,837

UNITED STATES PATENT OFFICE 2,666,837

FOOD CONDITIONER FOR COOKING RANGES

Almer H. Brodbeck, Webster Groves, Mo., assignor to Magic Chef, Inc., St. Louis, Mo., a corporation of New Jersey Application November 19, 1952, Serial No. 321,407

16 Claims. (Cl. 219—39)

This invention relates to food conditioners for cooking ranges, and more particularly to an air-circulating conditioner of this class.

The invention is an improvement upon the device shown in my copending U. S. patent application entitled Food Conditioner for Cooking Ranges, Serial No. 258,266, filed November 26, 1951, now Patent No. 2,641,679. In this copending application there is disclosed a unit having a blower and a duct with at least a portion of the duct pivoted with respect to the range and movable from a retracted position with respect to the back panel of a range to an extended position wherein it may blow air downward upon food placed on top of the range for warming or cooling the food. The principal object and feature of the present invention is the provision of an improved unit of this type which may be adjusted, when extended, to positions of different elevation with respect to the top of the range. Other objects and features will be in part apparent and in part pointed out hereinafter.

The invention accordingly comprises the structures hereinafter described, the scope of the invention being indicated in the following claims.

In the accompanying drawings, in which one of various possible embodiments of the invention is illustrated, Fig. 1 is a view in front elevation of a food conditioner unit of this invention in a retracted position in an opening in the back panel of a cooking range;

Fig. 3 is a vertical section taken on line 3—3 of Fig. 2;

Fig. 4 is a section similar to Fig. 2 illustrating the food conditioner unit in an extended position of minimum elevation above the top of the range; and, Fig. 5 is a vertical section taken on line 5—5 of Fig. 1 and illustrating the unit in a higher extended position than Fig. 4.

Corresponding reference characters indicate corresponding parts throughout the several views of the drawings.

Figure 5:
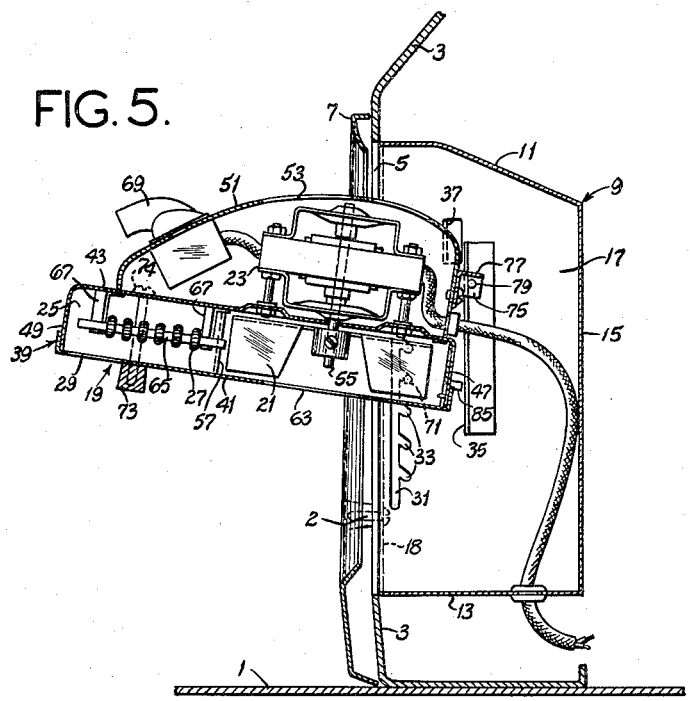
Figure 2:
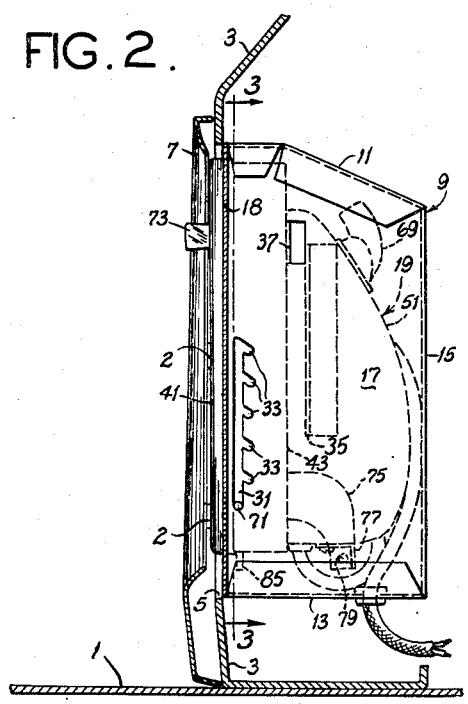
Fig. 2 is a vertical section taken on line 2—2 of Fig. 1.

Referring to the drawings, there is shown at 1 the top or working surface of a cooking range. The range has a back control panel 3 in which there is a generally rectangular opening 5 surrounded by trim 7. Fixed to the rear of the panel 3 is a housing 9 enclosing a space rearward of opening 5. The housing has a top wall 11, a bottom wall 13, a back wall 15 and side walls 17. The side walls have flanges 18 secured to the back panel 3 by screws, the screws also holding trim 7 in place, as indicated at 2. At 19 is shown a food conditioner unit comprising a fan 21, an electric motor 23 for driving the fan, an air duct 25 leading from the fan, and an electrical resistance heater element 27 in the duct. The duct has an outlet grille designated 29. I provide means mounting the unit 19 for movement from a retracted position in which it is located within the housing 9 and closes the opening 5, the unit being shown in this position in Figs. 1–3, and an extended position projecting forward from the opening over the working surface to direct a flow of air downward toward the working surface, and also for movement when extended toward and away from the working surface, together with means for releasably retaining the extended unit in positions of different elevation with respect to the working surface. Two such positions are shown in Figs. 4 and 5.

More particularly, each side wall 17 of the housing 9 has a generally vertical elongate slot 31. The two slots 31 are aligned in a generally vertical plane immediately rearward of the back panel. Each side wall 17 also has a plurality of vertically spaced branch slots 33 inclined downward and rearward from its slot 31. Each slot 33 in one side wall 17 is horizontally aligned with a respective slot 33 in the other side wall. On the inside of each side wall 17 to the rear of the slots is a vertical flange 35. Adjacent the upper ends of the flanges, tongues 37 are struck from the material of the side walls 17 to project into the housing.

The unit 19 comprises a case 39 having a rectangular outline corresponding to the outline of the opening 5. The case has a front panel 41, a back panel 43, side walls 45, a lower end wall 47 and an upper end wall 49. The motor 23 is mounted on the back panel 43 toward the lower end wall 47 of the case and is enclosed by a motor housing 51. This motor housing has the outline shown in dotted lines in Fig. 1 wholly within the rectangular outline of the case. It has ventilating openings 53. The motor shaft 55 extends through an opening in the back panel 43. Fan 21 is fixed on the end of the motor shaft within the case. The fan is of the centrifugal discharge type. It has a volute 57. The volute is part of a partition wall in the case 39 which has additional portions 59 and 61 reaching to the upper end wall 49 of the case and forming the duct 25.

The duct outlet 29 is in the front panel 41 adjacent the upper end wall 49 of the case 39. Air is admitted axially to the fan through an inlet 63 formed by a circular grille in the front panel 41 centered with respect to the fan. The heater element 27 is wound on a flat insulation core 65 mounted in the duct 25 on brackets 67. The motor and heater are both under control of a switch 69 carried on the motor housing 51. This switch is a three-position switch having an off position in which both the motor and heater are deenergized, a position in which the motor is energized and the heater is deenergized and a position in which both the motor and heater are energized.

The unit 19 is mounted in the housing 9 by means of pins 71 which extend from the side walls 45 of the case 39 adjacent the lower end 47 of the case into the slots 31. In the retracted position of the unit (Figs. 1–3), the pins 71 bear against the lower ends of the slots 31, and the unit is generally upright with the front panel 41 of the case 29 occupying the opening 5 within the confines of the trim 7 and complementing the appearance of the back panel 3. The center of gravity of the unit 19 is so located (noting that the relatively heavy motor is offset rearward from the axis of pins 71) that the entire unit is gravity-biased to swing clockwise as viewed in Fig. 2 against the tongues 37, which act as fixed stops engaged by the back of the case 39 determining its retracted position.

On the front panel 41 of the unit 19 is a handle 73. This is held in place by screws 74 which also serve to hold the front panel 41 and back panel 43 of the case 39 in assembled relation. By pulling on this handle, the unit 19 may be swung out of the case, pivoting on the axis of pins 71 located at the lower ends of slots 31, to the forwardly extending position illustrated in Fig. 4, with the front panel 41 (and duct outlet 29) facing generally downward. When the center of gravity of the unit swings over center, the unit is gravity-biased to swing counterclockwise as viewed in Fig. 4, and to hold the unit in forwardly extending position it is provided with arms 75 extending from the case 39, braced by a crossbar 77 and having pins 79 engageable behind the flanges 35 on the side walls 17 of the housing 9.

The pins 71 are made retractable so that they may be withdrawn from slots 31. For this purpose, leaf springs 81 are fixed at one end to the side walls 45 of the case 39 as indicated at 83. The free ends 85 of the springs project through openings 87 in the lower end wall 47 of the case. The pins 71 are fixed to the springs and extend through openings in the side walls of the case. By moving the free ends 85 of the springs toward one another, the pins 71 may be withdrawn from the slots 31 to permit the unit 19 to be removed and replaced.

In use, the unit 19 is swung open to the extended position illustrated in Fig. 4 projecting forward from the opening 5 over the working surface 1 of the range and with the duct outlet 29 directed downward. It may then be utilized for warming and defrosting frozen food, for example, in which case the switch 69 is turned to the position in which both the motor and heater are energized to direct a flow of hot air downward on the food as in a tray T on the working surface. Or, it may be utilized for cooling food, in which case the switch 69 is turned to the position in which only the motor is energized to direct a flow of cooling air downward on the food.

The extended position of the unit 19 shown in Fig. 4 is its lowermost extended position. Assuming that it is desired to have the unit 19 at a high elevation as, for example, to enable a higher container than the tray T to be positioned under the unit, the entire unit may be bodily raised, pins 71 sliding upward in the slots 31, and then moved rearward to engage the pins 71 in a related pair of the branch slots 33 thereby to hold the unit in an elevated position. As herein illustrated, there are five branch slots 33 for each slot 31, and hence the unit may be retained in any one of five positions of different elevation above its lowermost Fig. 4 position. In each one of the various possible extended positions of the unit 19, pins 79 engage behind flanges 35 to keep the unit from swinging downward under the gravity bias tending to swing it counterclockwise as viewed in Figs. 4 and 5.

To return the unit 19 to retracted position from any of its raised extended positions, the unit is tilted up to move the pins 71 out of the branch slots 33 into the slots 31. Then the unit is bodily lowered until the pins 71 engage the lower ends of slots 31, and finally the unit is swung upward to the retracted position shown in Fig. 2.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A food conditioner for a cooking range of the type having a substantially horizontal working surface and a back panel extending upward from the working surface, said back panel having an opening therein; a food conditioner unit comprising a fan, a motor for driving the fan, and means for heating air delivered by the fan; means mounting the unit for movement from a retracted position in which it closes the opening to an extended position projecting forward from the panel over the working surface to direct a flow of air downward toward the working surface and also for movement of the extended unit toward and away from the working surface; and means for releasably holding the extended unit in positions of different elevation with respect to the working surface.

2. A food conditioner for a cooking range of the type having a substantially horizontal working surface and a back panel extending upward from the work surface, said back panel having an opening therein; a food conditioner unit comprising a fan, a motor for driving the fan, an air duct leading from the fan and having an outlet, and a heater in the duct; means providing a pivotal and generally vertically movable connection between the unit and the panel whereby the unit may swing between a generally upright retracted position in which it closes the opening and an extended position projecting forward from the panel with the duct outlet directed generally downward in said extended position of the unit, the extended unit being movable toward and away from the working surface; and means for releasably holding the extended unit in positions of different elevation with respect to the working surface.

3. The combination set forth in claim 2 wherein the center of gravity of the unit is so located that the unit is gravity-biased to retracted position and, by overcentering action, to extended position.

4. The combination set forth in claim 3 further comprising a fixed stop engageable by the unit determining its retracted position and another fixed stop engageable by the extended unit in any position thereof to hold it in extended position.

5. The combination set forth in claim 2 wherein the means providing the pivotal and generally vertically movable connection between the unit and the panel includes a pair of pins received in a pair of elongate slots.

6. A food conditioner for a cooking range of the type having a substantially horizontal working surface and a back panel extending upward from the working surface, said back panel having an opening therein; comprising walls at the sides of the opening in the rear of the panel each having a generally vertical elongate slot; a food conditioner unit comprising a fan, a motor for driving the fan, an air duct leading from the fan and having an outlet, and a heater in the duct; pivot pins extending from the unit into the slots and slidable therein, said unit having a retracted position wherein the pins are at the lower ends of the slots and the unit is generally upright and closes the opening, and a lowermost out-swung extended position wherein the pins are at the lower ends of the slots and the unit projects forward from the panel with the duct outlet directed generally downward, the unit being movable upward from its said lowermost extended position, the pins sliding in the slots during such movement; and means for releasably holding the extended unit in positions of different elevation with respect to the working surface.

7. The combination set forth in claim 6 wherein the center of gravity of the unit is so located that the unit is gravity-biased to retracted position and, by overcentering action, to extended position.

8. The combination set forth in claim 7 further comprising a fixed stop engageable by the unit determining its retracted position and another fixed stop engageable by the extended unit in any position thereof to hold it in extended position.

9. A food conditioner for a cooking range of the type having a substantially horizontal working surface and a back panel extending upward from the working surface, said back panel having an opening therein; comprising walls at the sides of the opening in the rear of the panel each having a generally vertical elongate slot and a series of branch slots extending rearward from the elongate slot; a food conditioner unit comprising a fan, a motor for driving the fan, an air duct leading from the fan and having an outlet, and a heater in the duct; pivot pins extending from the unit into the elongate slots and slidable therein, said unit having a retracted position wherein the pins are at the lower ends of the elongate slots and the unit is generally upright and closes the opening, and a lowermost out-swung extended position wherein the pins are at the lower ends of the elongate slots and the unit projects forward from the panel with the duct outlet directed generally downward, the unit being movable upward from its said lowermost extended position, the pins sliding in the elongate slots during such movement, and the pins being engageable in the branch slots for releasably holding the extended unit in positions of different elevation with respect to the working surface.

10. The combination set forth in claim 9 wherein the center of gravity of the unit is so located that the unit is gravity-biased to retracted position and, by overcentering action, to extended position, and wherein there are fixed stops on the walls engageable by the unit determining its retracted position, and other fixed stops on the walls engageable by the extended unit in any position thereof to hold it in extended position.

11. A food conditioner for a cooking range of the type having a substantially horizontal working surface and a back panel extending upward from the working surface, said back panel having an opening therein; comprising walls at the sides of the opening in the rear of the panel each having a generally vertical elongate slot; a food conditioner unit comprising a case having a front and a back, a fan in the case, a motor on the back of the case for driving the fan, an air duct in the case leading from the fan and having an outlet in the front of the case, and a heater in the duct; pivot pins extending from the sides of the case into the slots and slidable therein, said case having a retracted position wherein the pins are at the lower ends of the slots and the case is generally upright in the rear of the back panel and with the front of the case at the opening, and a lowermost out-swung extended position wherein the pins are at the lower ends of the slots and the case projects forward from the panel with the duct outlet directed generally downward, the case being bodily movable away from its said lowermost extended position by upward sliding of the pins in the slots; and means for releasably holding the extended unit in positions of different elevation with respect to the working surface.

12. A food conditioner for a cooking range of the type having a substantially horizontal working surface and a back panel extending upward from the working surface, said back panel having an opening therein; comprising a housing on the rear of the panel enclosing a space rearward of the opening and having side walls at the sides of the opening each of which has a generally vertical elongate slot and a series of branch slots extending rearward from the elongate slot; a food conditioner unit comprising a case having a front and a back, a fan in the case, a motor on the back of the case for driving the fan, an air duct in the case leading from the fan and having an outlet in the front of the case, and a heater in the duct; pivot pins extending from the sides of the case into the elongate slots and slidable therein, said case having a retracted position wherein the pins are at the lower ends of the elongate slots and the case is generally upright in the housing with the front of the case at the opening, and a lowermost out-swung extended position wherein the pins are at the lower ends of the elongate slots and the unit projects forward from the panel with the duct outlet directed generally downward, the unit being movable upward from its said lowermost extended position, the pins sliding in the elongate slots during such movement, and the pins being engageable in the branch slots for releasably holding the extended unit in positions of different elevation with respect to the working surface.

13. The combination set forth in claim 12 wherein the center of gravity of the unit is so located that the unit is gravity-biased to retracted position and, by overcentering action, to extended position, and wherein there are fixed stops on the side walls of the housing engageable by the unit determining its retracted position and other fixed stops on the side walls engageable by the extended unit in any position thereof to hold it in extended position.

14. The combination set forth in claim 12 wherein the pins are retractable into the case.

15. The combination set forth in claim 14 wherein the pins are made retractable by being mounted on leaf springs fixed at one end in the case, the pins extending through openings in the sides of the case, and the leaf springs having free ends extending through openings in one end of the case.

16. The combination set forth in claim 12 wherein the motor is enclosed in a housing on the back of the case, and a combination motor and heater switch is mounted on the motor housing.

ALMER H. BRODBECK.

No references cited.